Jan. 17, 1967   J. E. HALL, SR   3,298,699
PRESSURE CONTROL DEVICE
Filed Dec. 12, 1963   5 Sheets-Sheet 1

INVENTOR.
Jesse E. Hall, Sr.
BY
Scofield, Kokjer, Scofield & Lowe
ATTORNEYS.

Jan. 17, 1967  J. E. HALL, SR  3,298,699
PRESSURE CONTROL DEVICE
Filed Dec. 12, 1963  5 Sheets-Sheet 2

INVENTOR.
Jesse E. Hall, Sr.,
BY
Seifield, Kokjer, Scofield & Lowe
ATTORNEYS.

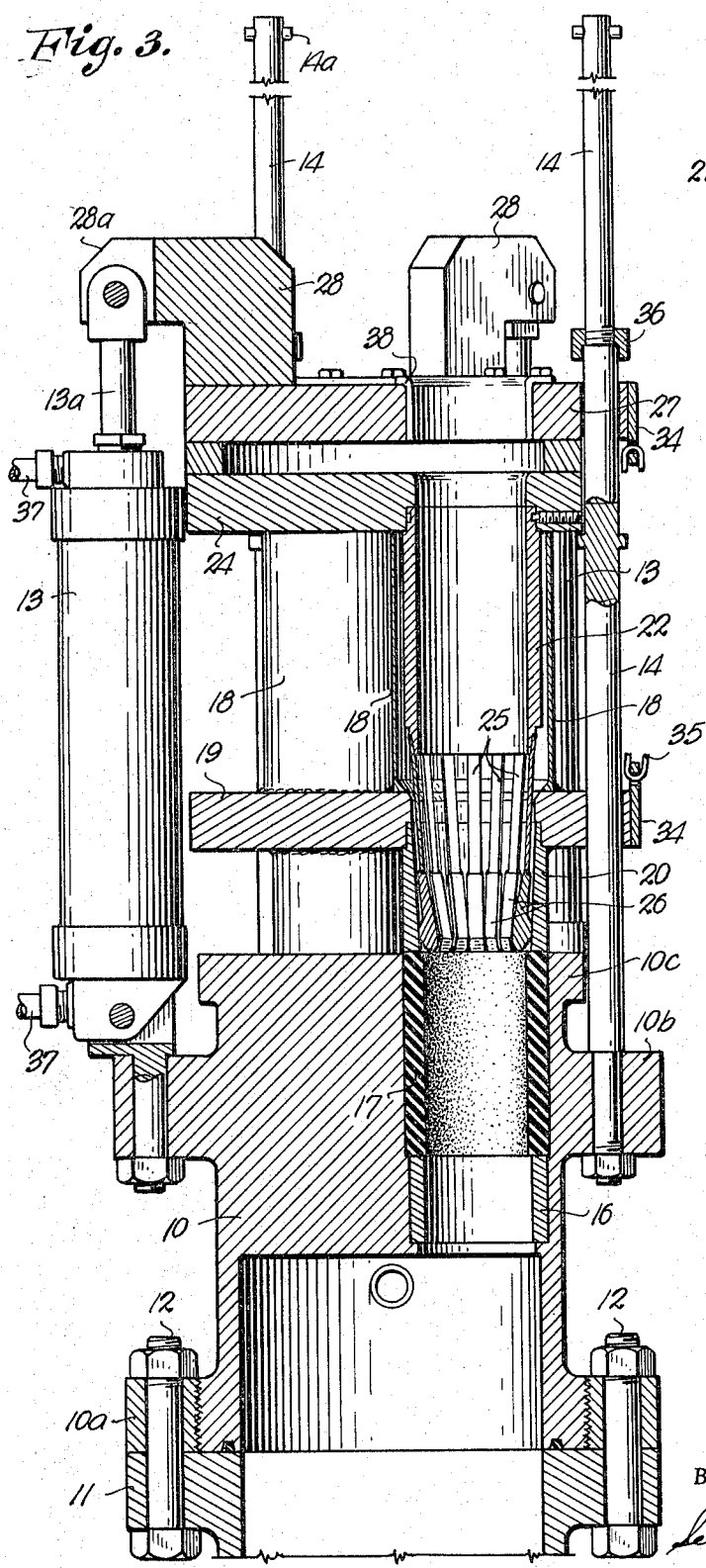
Fig. 3.
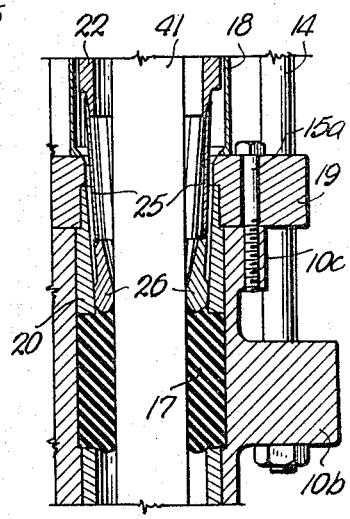
Fig. 10.
Fig. 11.
INVENTOR.
Jesse E. Hall, Sr.,
BY
*Sefield, Kokjer, Sefield & Lowe*
ATTORNEYS.

INVENTOR.
Jesse E. Hall, Sr.,
BY
Scofield, Kokjer, Scofield & Lowe
ATTORNEYS.

INVENTOR.
Jesse E. Hall, Sr.
BY
Scofield, Kokjer, Scofield & Lowe
ATTORNEYS.

United States Patent Office 3,298,699
Patented Jan. 17, 1967

3,298,699
PRESSURE CONTROL DEVICE
Jesse Elmer Hall, Sr., Weatherford, Tex., assignor, by mesne assignments, to Trojan, Inc., Panama, Panama, a corporation of Panama
Filed Dec. 12, 1963, Ser. No. 330,151
3 Claims. (Cl. 277—103)

This invention relates to improvements in a pressure control device for attachment of the casing of an oil or gas well at the well head and refers more particularly to a blowout preventer for wells producing from a plurality of strings of tubing.

Pressure control equipment presently used is adapted to seal but a single production string and commonly employs pistons or plungers capped with rubber sealing elements which are forced against the exterior surface of the tubing by plungers positioned transversely or at right angles to the tubing axis.

In some deep wells where high pressures are encountered such sealing equipment has proved unsatisfactory and no equipment, to my knowledge, is presently available for multistring installations.

An object of the invention, therefore, it is provide a device which furnishes a safe and adequate seal in multistring installations against excessively high pressures.

Another object is to provide a convertible device that may be used as well in installations producing from a single string or from multiple strings with but small alterations.

A further object is to provide a blowout preventer whose sealing elements are compressed by forces imposed longitudinally or parallel to the axis of the production string as contrasted with the conventional practice to compress the sealing elements by forces applied transversely to the production string axis.

A still further object is to provide a blowout preventer whose sealing elements after compression are reinforced both above and below by rigid metallic members.

Other and further objects will appear from the description and specification which follows.

In the accompanying drawings which form a part of the instant specification and are to be read in conjunction therewith, there is shown a preferred embodiment adapted for use in practicing the invention and in these drawings like reference numerals are used to indicate like parts in the various views.

FIG. 3 is a vertical section taken along the line 3—3 in FIG. 1 in the direction of the arrows.

FIG. 10 is a fragmentary vertical section of a modified type tubing hanger from that shown in FIGS. 1, 3, 4, 5 and 7.

FIG. 11 is a fragmentary vertical section with one of the flexible sealing members compressed as in FIGS. 5 and 7 showing the short type of holding bolt.

Figure 1:
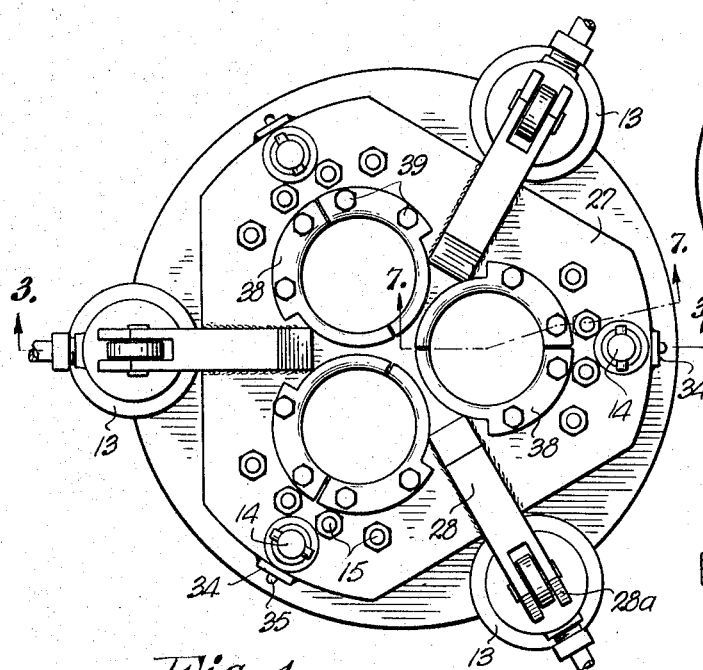
FIG. 1 is a top plan view of the device.

Referring to the drawings, the body portion 10 of the device has a bottom flange 10a for mounting on the top of well casing flange 11 at the well head by screw bolts 12. An intermediate flange 10b of the body has attached thereto the lower ends of hydraulic cylinders 13 and guide rods 14. An upper flange 10c anchors the lower ends of holding bolts 15 and 15a. The body 10 is penetrated longitudinally in the device shown by three holes (only one shown in FIGS. 3, 4 and 13) of sufficient diameter to permit passage of the tubing and its couplings when annular rings 16 and compressible elements 17 are seated therein.

The ram assembly is in three parts, a lower section composed of three open top cylindrical housings 18 affixed at their lower ends to plate 19. Circular holes in plate 19 correspond substantially in size with the inside diameters of the housing 18 and are aligned with the holes through the body. Depending from bottom plate 19 and fixedly attached thereto are annular extensions 20 whose cross section at their lower ends correspond substantially to that of the unexpanded compressible elements 17, shown best in FIGS. 3, 4, 5, 7, 11 and 13. A section of tubing 21 is shown in the device in FIGS. 5, 7, 11 and 13 after sealing elements 17 have been compressed.

An intermediate section of the ram assembly comprises three sleeves 22 affixed by set screws 23 to the underneath side of plate 24 and slidable into or telescoping the open top housings 18 of the lower section. Attached to and spaced around the circumferential lower edges of sleeves 22, and depending into housings 18, are flexible fingers or legs 25 terminating at their lower free ends in enlarged shoes 26.

The upper section of the ram assembly is the cap or pressure plate 27 and 27a, likewise perforated similarly with the other sections by holes to accommodate passage of the production strings 21 and their couplings 21a. Arms 28 affixed to the top surface of the plate 27 have lateral extensions 28a to which the piston rods 13a of the hydraulic cylinders are attached. Top plate 27 has the shape of a truncated isosceles triangle when viewed from above, as shown in FIG. 1, the sides of the plate accommodating the hydraulic cylinders, the truncated portions supplying flange extensions which are perforated to permit passage of guide rods 14.

Figure 8:
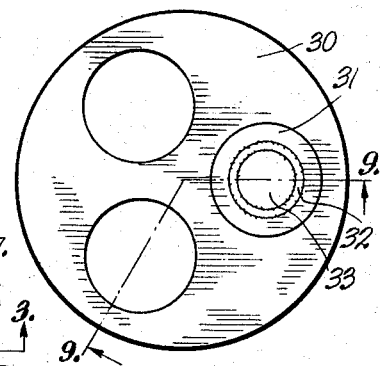
FIG. 8 is a top plan of a supplementary plate used when plugging one of the holes and passageways of the device.
Figure 7:
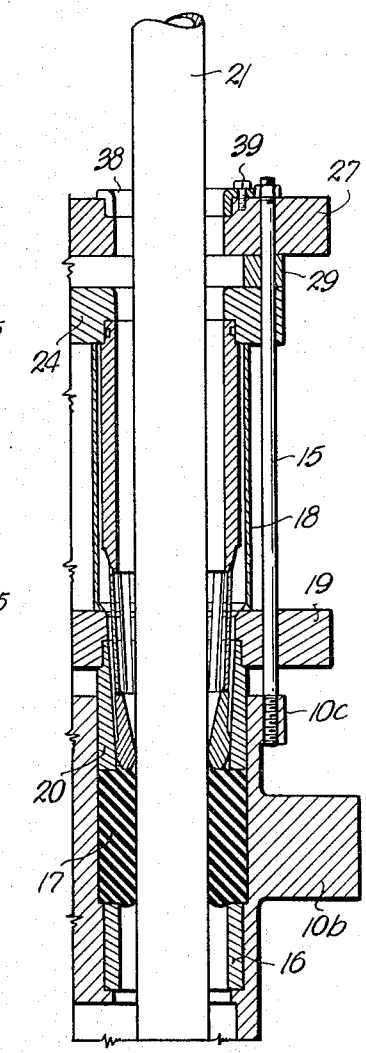
FIG. 7 is a fragmentary vertical section taken along the line 7—7 in FIG. 1 in the direction of the arrows with the sealing element compressed and the holding bolts in place.
Figures 12, 13:
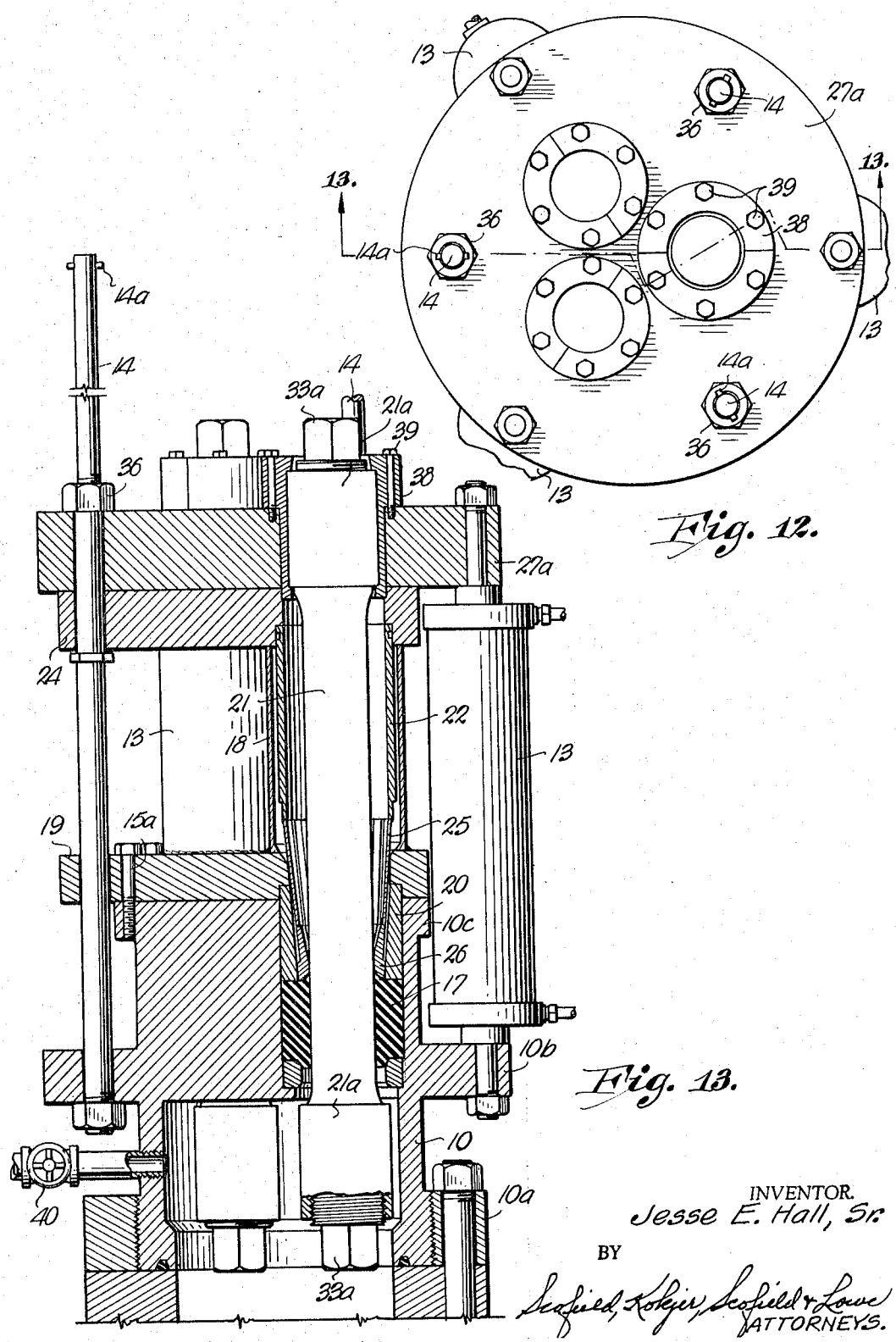
FIG. 12 is a top plan view of a modified type of cap or pressure plate.
FIG. 13 is a vertical section taken through the line 13—13 in FIG. 12 showing a construction using only short holding bolts and a modified type plug arrangement.

In FIGS. 12 and 13 is shown a modified type of cap or pressure plate 27a which is circular in form and has the upper ends of hydraulic pistons 13a attached directly to the plate instead of by arms 28, as shown in FIGS. 1, 2, 3 and 4. Also in this modified construction the holes and passageways through the top plate and ram sections are of different sizes to accommodate different sizes of tubing often used in multistring installations. A spacer ring 29 having the same diameter and thickness as plug holding plate 30, shown in FIG. 8, is positioned between pressure plate 27 and the upper plate 24 of the intermediate ram section. This spacer ring is drilled, as are plates 19, 24, 27 and 27a to permit passage of holding bolts 15, as shown in FIG. 7.

Figure 9:
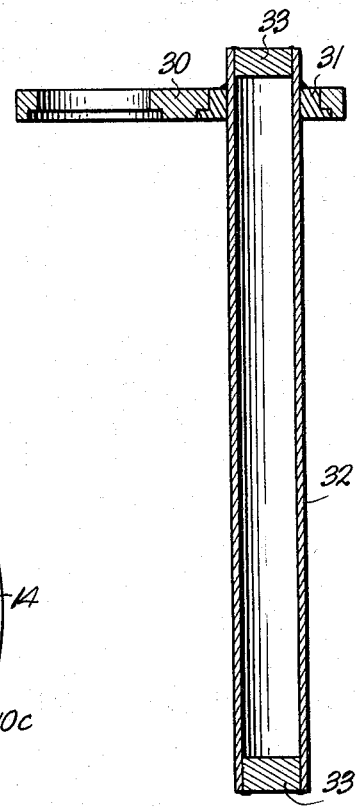
FIG. 9 is a vertical section taken along the line 9—9 in FIG. 8 in the direction of the arrows.
Figure 6:
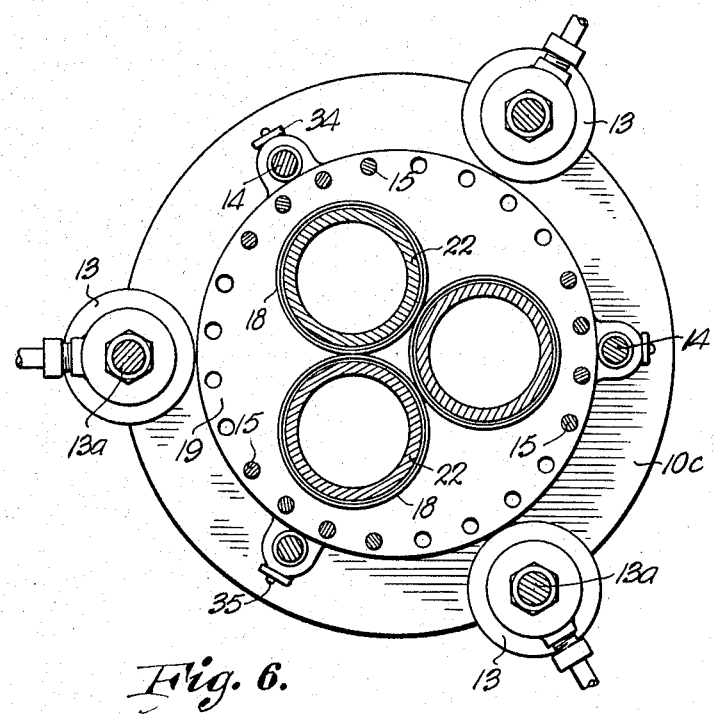
FIG. 6 is a cross-sectional view taken along the line 6—6 in FIG. 4 in the direction of the arrows.

When it is desired to plug one or more of the holes and passageways through the ram sections, the devices of FIGS. 9 or 13 may be used. A shouldered hole is machined in plug holding plate 30, as shown in FIG. 9, to receive a flanged insert 31 in which is fixedly welded a tubular plug 32 internally closed at its ends by disks 33. If plugging of a passageway is accomplished by the device of FIG. 13, plugs 33a are screwed directly into couplings of the tubing.

To plates 19, 27 and 27a are welded, or otherwise affixed, chain fastening members 34 to which are attached flexible cables or chains, partially indicated at 35. These flexible chains or cables loosely hold the sections of the ram assembly together permitting, when the preventer is opened, withdrawal of the intermediate section from the lower section to the extent that the fingers 25 and shoes 26 attached to sleeves 22 are raised upwardly in housings 18, as shown in FIGS. 3 and 4.

Guide rods 14 are threaded in the vicinity of top plates 27 and 27a to receive nuts 36 which, when screwed down against the top plate, furnish supplemental assurance against separation of the ram assembly sections should holding bolts 15 and 15a be insufficient or fail. Removable cross pins 14a at the top of the guide rods serve as stops to prevent accidental separation of the top section from the ram assembly and harm to the hydraulic cylinder heads should the flexible fastening cables or chains 35 be disconnected.

Hydraulic fluid is introduced and discharged to and from cylinders 13 through pipes 37 from a high pressure hydraulic system, not shown. Two-part flange inserts 38 or 38a may be fitted into any of the holes in top plates 27 and 27a when it is desired to use them as tubing hangers or in connection with the plugging equipment. These inserts are held in place by bolts 39. The modified type of insert 38a held in place by bolts 39 is shown in FIGS. 10 and 13, supporting the enlarged coupling 21a of tubing sections 21.

Figure 4:
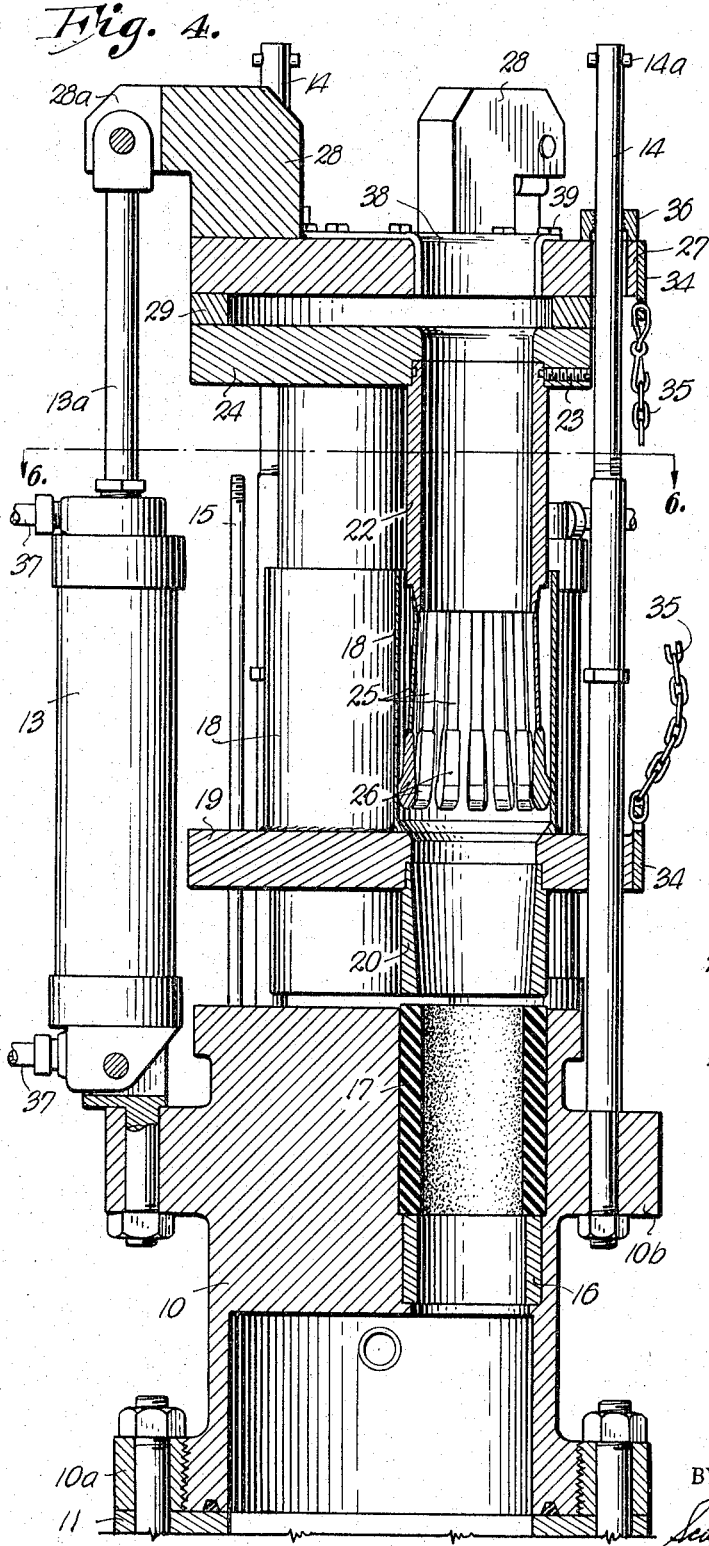
FIG. 4 is a vertical section similar to FIG. 3 with the ram assembly shown in a raised position.
Figure 5:
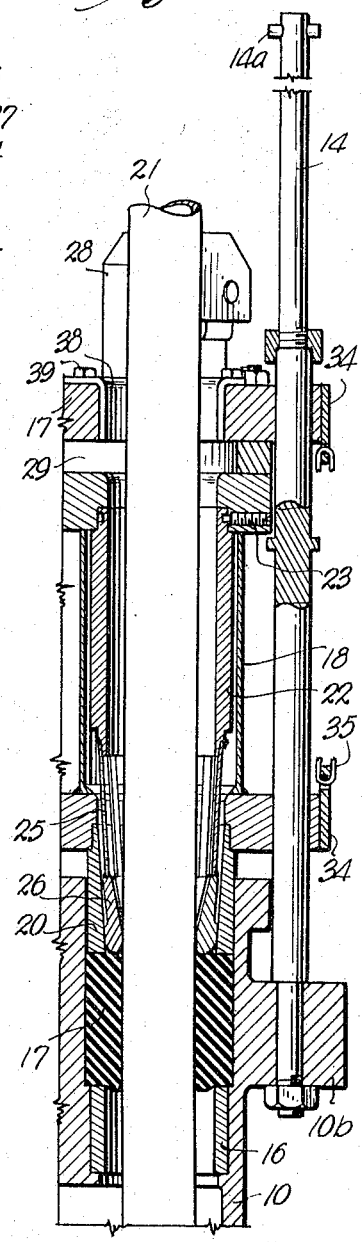
FIG. 5 is a fragmentary vertical section of a short length of one of the production strings in the device with the sealing element surrounding it under compression and the holding bolts in place.

In use the control device is lifted from a transporting vehicle by a crane or chain hoist and bolted to the top flange of an oil well or gas well surface casing, as shown in FIGS. 2, 3, 4 and 13. At this time the ram assembly is in a raised position, as shown in FIG. 4, with fingers 25 and shoes 26 expanded into the housing above plate 19 so the tubing and tubing couplings can easily pass through the holes of the device. The separate production strings of tubing, whether there be one, two or three strongs, are fed into the separate passageways through the preventer by a conventional type spider or multiple slip, which feeds the tubing into the control device or preventer and surface casing as the tubing sections are made up on the rig.

Figure 2:
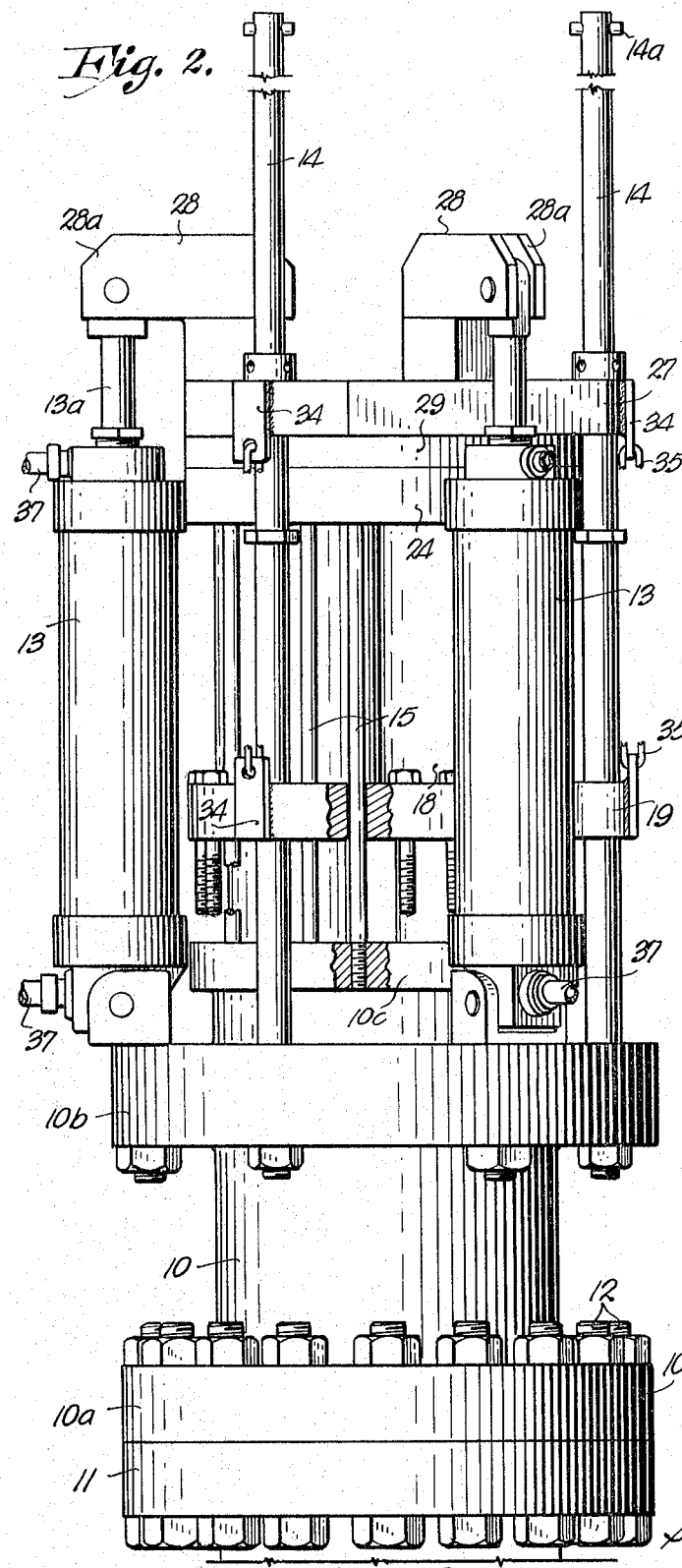
FIG. 2 is a side elevation showing the ram assembly in a partially lowered position just prior to compressing the sealing elements.

At any time during the running of the tubing the preventer may be used to seal off the pressure at the well head. Also after the well is cemented and prior to perforating the strings opposite the different producing horizons, the preventer provides the essential safety appliance where high pressure gas is encountered. To operate the hydraulic fluid is charged to cylinders 13 to lower the upper section of the ram assembly into the upper ends of the open top housings 18. This is the intermediate position when the plate 24 contacts the tops of the housings 18 and sleeves 22 have entered and have telescoped into the housings, as shown in FIG. 2 and 3. As the plates 24, 27 or 27a are further depressed by the hydraulic cylinders the enlarged ends 26 of flexible legs or fingers 25 enter and slide into the depending annular extension members 20. With further lowering of the ram assembly, members 20 and shoes 26 form rigid annular plungers against the tops of compressible elements 17, forcing them downwardly against supporting rings 16 and whatever well pressure is imposed against the bottom edge of elements 17. By thus compressing the ring material, it is forced outwardly against the boreholes through the body and inwardly against the exterior surface of the tubings to form a pressure tight seal. After the seal is made between the body and tubing strings, holding bolts 15 and 15a are screwed down to rigidly hold the ram assembly in a lowered position, as shown in FIGS. 5, 7, 11 and 13. Also at this time nuts 36 are screwed onto the threaded sections of guide rods 14.

When but two production strings are run the third passageway through the preventer may be plugged by either the tubular plug 32, shown in FIGS. 8 and 9, or the device shown in FIG. 13. In using the tubular plug shown in FIGS. 8 and 9, flange ring 31 to which tube 32 is welded, is fitted into one of the shouldered holes in plate 30. Plate 30 is then placed within the spacer ring 29 between plates 24 and 27. When thus assembled depressing of the compressible elements by the ram assembly forms a pressure tight seal against the exterior of the tubular plug 32 as well as the production strings of tubing. If it is desired to plug the tubing string supported in hangers of the type shown in FIG. 10, it is only necessary to make up a short length of tubing 21 with couplings 21a at both ends and screw plugs 33a directly into the couplings 21a, as shown in FIG. 13.

To release the compressive pressure imposed on elements 17 holding bolts 15 or 15a are removed and nuts 36 on the guide rods 15 backed off. Hydraulic fluid may be introduced to reverse the thrust of the hydraulic cylinders to lift the ram assembly, or it may be raised by a suitable hoist. Uncoupling of the body flange 10a of the preventer from flange 11 of the surface casing is then accomplished by removing bolts 12 which permits the lifting of the control device or preventer from the well head.

To dismount the preventer from the well head pressure is tested at gate valve 40, shown in FIG. 13. If the pressure is excessive the liquid column in the well is increased or weighted until the pressure on the preventer is reduced to the desired degree. Any accumulated pressure within the preventer body is relieved through valve 40. Holding bolts 15 and 15a and nuts 36 on guide rods 14 are then backed off, permitting the upper ram section to be lifted so sleeves 22 are withdrawn from housings 18 and fingers 25 with their enlarged ends 26 expanded into the housings, as shown in FIG. 4. Hydraulic fluid may be introduced to reverse the thrust of the hydraulic cylinders to lift the upper section of the ram assembly, or it may be raised by a suitable hoist.

Upon removing the bolts 12 from flanges 10a and 11 the preventer can then be lifted from the flange of the surface casing and a permanent well head fixture put in its place.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A pressure control device for well head pressures comprising
   a body attached to the upper end of a well casing, said body having a plurality of holes therethrough parallel to its axis for the passage of production tubing,
   compressible sealing elements seated in the holes of said body, having an inside diameter sized to permit the passage of the tubing couplings,
   a vertically movable ram assembly with longitudinal passageways aligned with holes of the body and annular ram extensions at the lower ends of the passageways whose cross sections correspond substantially to those of the compressible sealing elements, cylindrical telescoping members vertically movable in the assembly passageways, whereby the lower ends of said telescoping members and the annular ram extensions form plungers for compressing the sealing elements, fluid pressure cylinders in a fluid pressure system attached at their lower ends to the body and at their upper ends to the ram assembly, whereby the ram assembly is moved downwardly to compress the sealing elements against the tubing in pressure-tight relationship and fastening means between the body and ram assembly for holding them in said pressure-tight relationship.

2. A pressure control device as in claim 1 wherein, flexible fingers depending from the annular ram extensions form plungers with said extensions for compressing the annular sealing elements.

3. A pressure control device as in claim 2, in which the diameter of the passageways through the ram assembly permits expansion of the flexible fingers for the passage of the tubing couplings, the diameter of the ram extensions constricted relative to said passageways and tapered from top to bottom.

References Cited by the Examiner

UNITED STATES PATENTS

| | | | |
|---|---|---|---|
| 1,693,039 | 11/1928 | Minor | 285—140 X |
| 1,851,940 | 3/1932 | Williams | 285—137 X |
| 2,076,042 | 4/1937 | Penick et al. | 277—73 |
| 2,559,321 | 7/1951 | Seamark | 277—73 |
| 3,052,301 | 9/1962 | Watts et al. | 285—137 |
| 3,127,197 | 3/1964 | Kretzschmar | 285—137 |

CARL W. TOMLIN, *Primary Examiner.*

D. W. AROLA, *Assistant Examiner.*